United States Patent [19]

Stratton, III

[11] 3,860,908

[45] Jan. 14, 1975

[54] ROM MULTIPLE CODE CONVERSION APPARATUS

[75] Inventor: Lee N. Stratton, III, Phoenix, Ariz.

[73] Assignee: Honeywell Information Systems Inc., Waltham, Mass.

[22] Filed: Feb. 4, 1974

[21] Appl. No.: 439,499

[52] U.S. Cl. ................. 340/146.1 AG, 340/347 DD

[51] Int. Cl. ........................ G06f 11/10, H03k 13/34

[58] Field of Search ............ 340/146.1, 146.1 AG, 340/347 DD, 172.5, 173 SP

[56] References Cited

UNITED STATES PATENTS

| | | | |
|---|---|---|---|
| 2,958,072 | 10/1960 | Batley | 340/146.1 AG |
| 3,200,242 | 8/1965 | Crawford et al. | 340/146.1 AG |
| 3,391,394 | 7/1968 | Ottaway et al. | 340/172.5 |
| 3,622,981 | 11/1971 | Greenbaum | 340/146.1 AG |
| 3,771,145 | 11/1973 | Wiener | 340/173 SP |

OTHER PUBLICATIONS

Burdick, Parallel 12 to 6 and 12 to 1 Translators, IBM Technical Disclosure Bulletin, Vol. 3, No. 5, October 1960, pp. 26 & 27.

*Primary Examiner*—Charles E. Atkinson
*Attorney, Agent, or Firm*—Edward W. Hughes

[57] ABSTRACT

The code conversion apparatus uses a read-only memory, a parity checker and a plurality of logic gates to convert data characters from any one of several information codes to any one of several other information codes. The apparatus provides parity checking of each of the converted characters and also provides an illegal-input code flag when asked to convert an illegal input character.

6 Claims, 4 Drawing Figures

ROM MULTIPLE CODE CONVERSION APPARATUS

BACKGROUND OF THE INVENTION

The present invention pertains to apparatus for converting from one data information code to another data information code and more particularly to apparatus which uses a read-only-memory, a parity checker, and a plurality of logic gates to convert information from any one of several data information codes to any one of several other data information codes. The apparatus provides parity checking of each of the converted characters and provides a warning signal called an illegal-input code flag when asked to convert a character which is not part of the characters in the original code set.

In modern data processing systems data is stored on a storage medium such as magnetic tape or disk for retrieval and use at a later time. The data which is stored on the magnetic storage medium includes alphanumeric data characters which may be represented by binary bits in any one of several data information codes. For example, in one code each of the alphanumeric data characters may be represented by a total of 7 bits. In another data information code each of the alphanumeric characters may be represented by a total of 9 bits. When these alphanumeric data characters are retrieved from the storage medium they may be processed by a data processor which uses a data information code with each of the characters having a total of 6 bits. Thus, it is important that the data information be converted from one of the data information codes to any one of several other data information codes for use in various parts of a data processing system. This conversion is done by the use of code converters which may be any one of several types.

Some of the prior art code converters use a table look-up technique where a list of characters in the input codes are stored in an active memory with each character of the input codes referring to a corresponding character of an output code. When an input character is received, the table look-up apparatus starts at the top of a table containing a list of characters in one of the codes and compares the character being received with a character stored in the first memory location. This continues for each of the memory locations until the character being received is matched by the character stored in one of the memory locations. This memory location of the matched character may also contain the address of a corresponding character in another code. The apparatus then retrieves the corresponding character from the address specified. When another input character is received the table look-up apparatus again starts at the top of the list of characters and continues down the list until a match occurs. Each comparison requires a considerable period of time so that the table look-up conversion from one code to another code is very slow and time consuming.

Other prior art code converters use read-only-memories or ROM's to convert from one code to another. These ROM memories use each character of the input code as an address in memory to locate a corresponding character in another code. However, these prior art ROM code converters do not have means for checking the parity or accuracy of the characters in the new code. The present invention uses a ROM wherein each of the characters of a first code corresponds to an address in the memory of the ROM. Stored in that address is a corresponding character in another code which is available without any table look-up. The present invention also utilizes unused input address bits so that more than one code translation set may be stored in one integrated circuit chip. The present invention also provides an output warning signal whenever an illegal input character is applied to the ROM. The present invention provides either odd or even parity bits for output codes which contain characters which do not require that all of the binary bits from the ROM be used to represent characters in the output code.

It is, therefore, an object of this invention to provide new and improved apparatus for converting from one data information code to another data information code.

Another object of this invention is to provide apparatus for using read-only-memories to convert from one data information code to another data information code.

Still another object of this invention is to provide apparatus for using read-only-memories to convert from a first data information code to a second data information code and to check the parity of the characters of the data in the second information code.

A further object of this invention is to provide apparatus for using a read-only-memory to convert from a first data information code to a second data information code and to deliver a warning signal when an illegal data character is received by the read-only-memory.

SUMMARY OF THE INVENTION

The foregoing objects are achieved in the present invention by providing code conversion apparatus which uses a read-only-memory, an odd parity checker and a plurality of logic gates to rapidly convert data characters from any one of several data information codes to any one of several other data information codes. The apparatus provides parity checking of each of the converted characters and also provides an illegal-input code flag when asked to do a conversion of an illegal input character.

Other objects and advantages of this invention will become apparent from the following description when taken in connection with the accompanying drawings.

DESCRIPTION OF THE PREFERRED EMBODIMENT

Figure 1A:
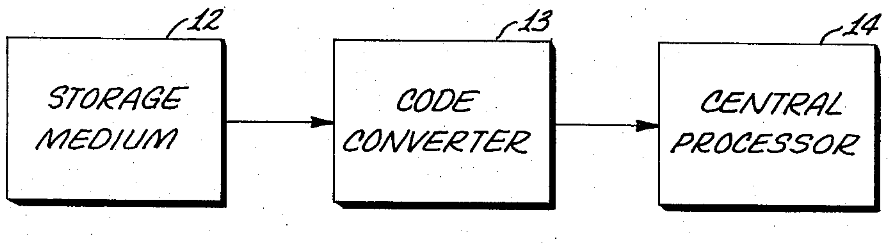
FIGS. 1*a* and 1*b* show a blocked diagram of a data processing system using the present invention.
Figure 1B:
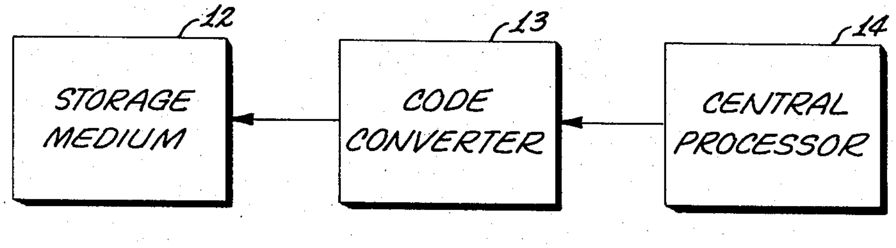

Referring now to FIGS. 1*a* and 1*b*, there is shown a portion of a data processing system using the present invention. A data storage medium 12 may contain information which is stored in any one of several data information codes. The data from the storage medium 12 may be converted from any one of several data information codes by converter 13 to any one of several other data information codes for use by the central processor 14. Conversely, data from the central processor may be converted from any one of the data information codes by the code converter 13 to any one of the other data information codes and stored in the storage medium 12 as shown in FIG. 1*b*.

Figure 2:
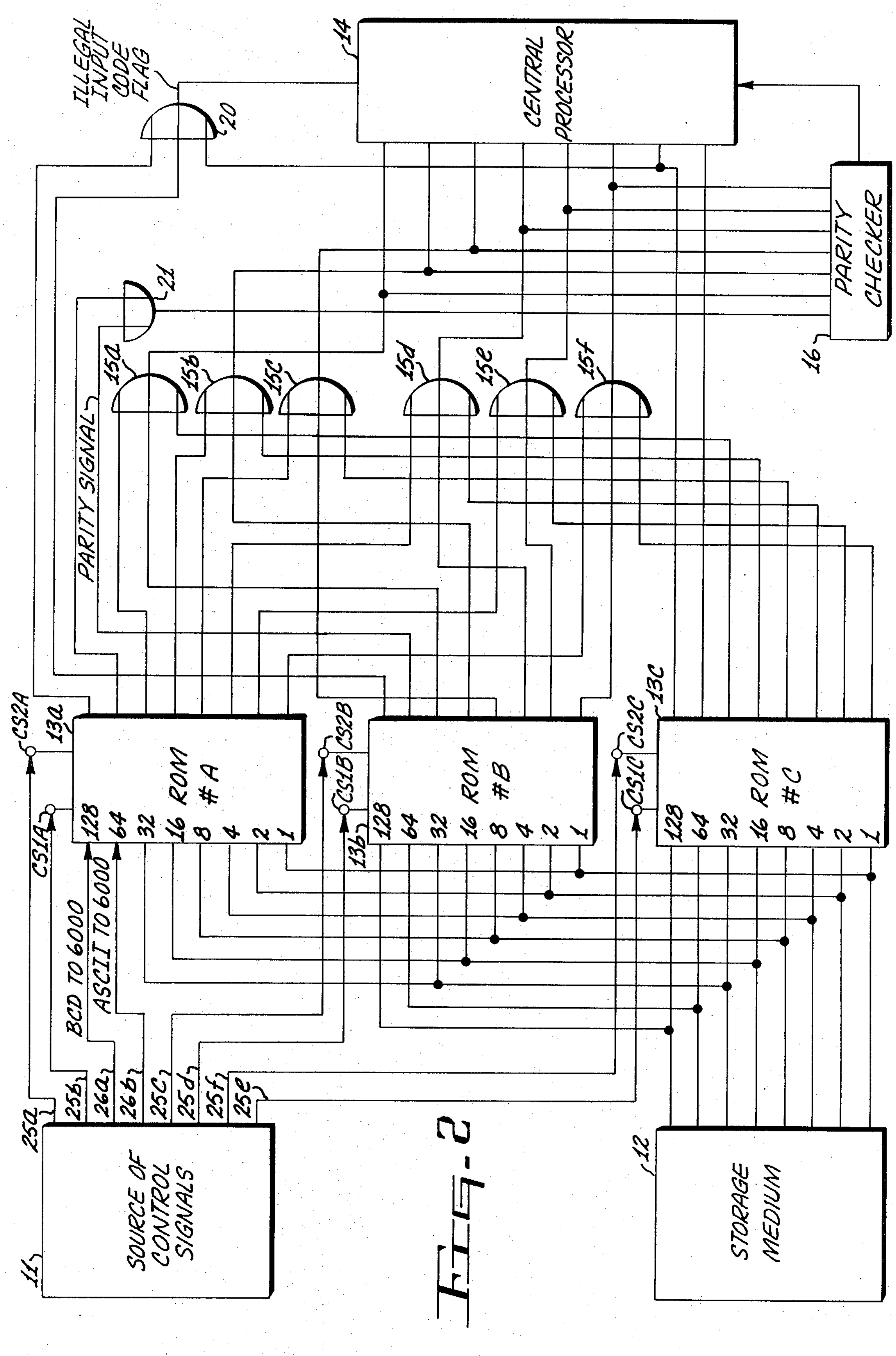
FIG. 2 shows an embodiment of the present invention.

FIG. 2 shows details of the apparatus of FIG. 1*a* and includes a source of control signals 11, a storage medium 12, a plurality of read-only-memories or ROM code converters 13*a*–13*c*, a plurality of logic gates, a parity checker or a parity generator 16 and a central processor 14. The ROM converters may convert from any one of several data information codes to any of several other data information codes. For example, ROM converters 13*a* may be used to convert 7-bit characters from a first data information code into 6-bit characters in another data information code for use by the central processor 14. In the example shown ROM converter 13*a* converts from 7-bit "binary coded decimal" or BCD code to a 6-bit Honeywell 6000 code when a signal from source 11 is applied to output lead 26*a* and to input lead 128 of converter 13*a*. This same ROM 13*a* converts from the 7-bit "USA code For Information Interchange" or ASCII code to the 6-bit Honeywell 6000 code when a signal from source 11 is applied to output lead 26*b* and to input lead 64 of ROM 13*a*. ROM converter 13*a* also develops a parity signal for use by the odd parity checker 16 and develops an illegal-input code flag or illegal-input code signal whenever the signal from an illegal character is applied to the input leads of the converter 13*a*. An illegal-input signal is any signal from a character which is not a member of the input code set which is being received by converter 13*a*. For example, when a signal from lead 26*a* causes converter 13*a* to convert from the BCD code to 6000 code any character not in the BCD code set would cause converter 13*a* to provide an illegal-input code flag to gating means 20 and to the central processor 14. Gating means 20 and 21 and logic gates 15*a*–15*f* are OR-gates of the type which are well known in the art.

Figure 3:
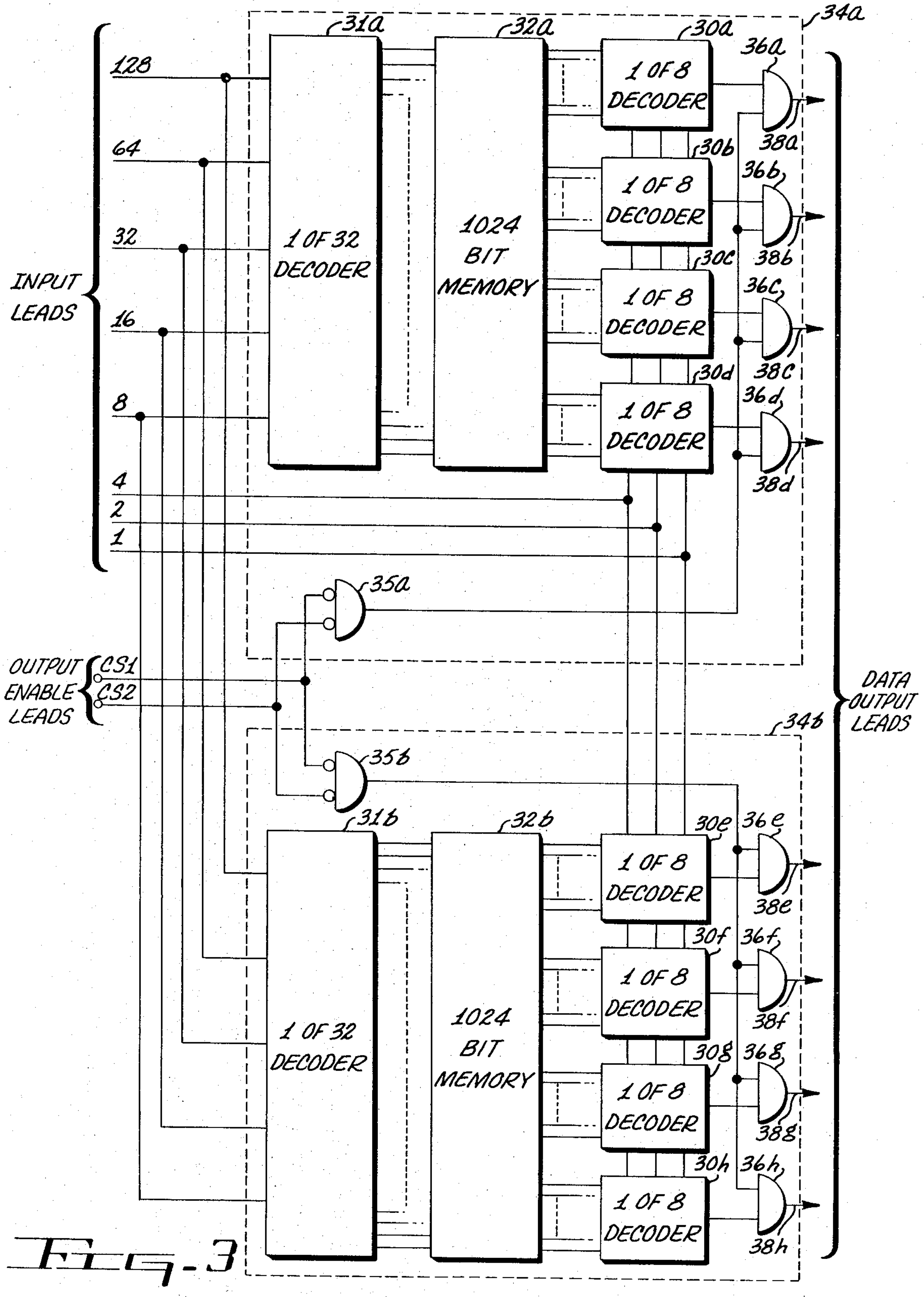
FIG. 3 shows details of each of the ROM's used in the apparatus of FIG. 2.

Source 11 also provides control signals to the input terminals CS1 and CS2 of converters 13*a*–13*c* to enable the output leads of these converters. This is shown in more detail in the detailed drawing of a converter as disclosed in FIG. 3. Each of the converters 13*a*–13*c* includes a pair of Bipolar ROM's 34*a* and 34*b*. Each ROM includes a 1 of 32 decoder 31, a 1024 Bit Memory 32, 1 of 8 decoders 30, NAND-gate 35 and a plurality of AND-gates 36. These ROM's are available as integrated circuit chips from several manufacturers. For example, one integrated circuit chip which may be used is the 3301A made by the Intel Corporation. Each of these pairs of Bipolar ROM's includes eight input leads, eight data output leads or signal output leads and a pair of output enable or control leads CS1 and CS2. A signal applied to either of these control leads CS1 and CS2 causes gates 35*a* and 35*b* to provide an enable signal to AND-gates 36*a*–36*h* so that signals from the 1,024 bit memories 32*a* and 32*b* are coupled to the signal output leads 38*a*–38*h*. The structure of the 1,024 bit memory in each of the ROM's is determined by a truth table or set of specifications which is presented to the manufacturer. For example, ROM converter 13*a* of FIG. 2 contains a memory which provides a 6-bit character and a parity signal and also provides an illegal-input code flag when an illegal character is coupled to the input leads 1–128. ROM converter 13*c* contains a memory which provides a 7-bit character or an illegal-input code flag but does not provide a parity signal. Details of the operation of the 3301A ROM may be found in the "Intel Data Catalog February 1973" by the Intel Corporation, Santa Clara, Calif.

The input leads 1, 2 and 4 of the converters are each coupled to a plurality of 1 of 8 decoders 30*a*–30*d*. Input leads 8, 16, 32, 64 and 128 are each coupled to a 1 of 32 decoder 31. Thus, the input signals provide signals which select one of 2,048 bits positions which are located in the 1,024 bit memories 32*a* and 32*b*. Each of these bit positions is an address which corresponds to a particular one of the input characters in the code which is being applied to the input leads. The signals on the select input leads 1–128 also cause one of the bipolar ROM's 34*a* and 34*b* to be selected by the signal addressing the select input leads.

ROM converter 13*b* converts data which is stored in an 8-bit code in storage medium 12 into information in a 6-bit code for application to the input leads of central processor 14. ROM converter 13*b* also provides a parity signal to the parity checker 16 and provides an illegal-input code flag to the input lead of central processor 14 when illegal character is presented to converter 13*b*. The ROM converter 13*c* converts information which is in an 8-bit code into a 7-bit code for use by central processor 14.

The parity checker or parity generator 16 may be used to generate a parity signal from the signals at the output leads of gates 15*a*–15*f* and compare the generated signal with the parity signal from gate 21. When ROM converter 13*c* is providing the signal to processor 14 and generator 16, the parity signals developed by generator 16 are coupled to processor 14 without any compare as ROM converter 13*c* does not provide a parity signal. A parity generator/checker which may be used is the SN74S280 from Texas Instruments, Inc. Details of the SN74S280 may be found in the book "The TTL Data Book for Design Engineers" 1973 by Texas Instruments, Inc., Dallas, Tex.

While the principles of the invention have now been made clear in an illustrative embodiment, there will be many obvious modifications of the structure, proportions, materials and components without departing from those principles. The appended claims are intended to cover any such modifications.

I claim:

1. Multiple code conversion apparatus for use with a storage medium and a central processor, said apparatus comprising:

a plurality of ROM code converters each having a plurality of signal input leads, a control lead, an illegal-input code flag lead and a plurality of signal output leads, each of said signal input leads being connected to said storage medium, each of said output leads being coupled to said processor, said input code flag lead being coupled to said processor; and a source of control signals, said source being connected to said control lead of each of said converters.

2. Multiple code conversion apparatus as defined in claim 1 including:

a parity generator having a plurality of input leads and an output lead, each of said input lead of said generator being coupled to a corresponding one of said signal output leads of each of said converters, said output lead of said generator being connected to said processor.

3. Multiple code conversion apparatus for use with a storage medium and a central processor, said apparatus comprising:

first and second ROM code converters each having a plurality of signal input leads, a control lead, an illegal-input code flag lead and a plurality of signal output leads, each of said input leads of said converters being connected to said storage medium;

a source of control signals, said source being connected to said control lead of each of said converters;

a plurality of logic gates each having first and second input leads and an output lead, said first input lead of each of said logic gates being connected to a corresponding one of said signal output leads of said first converter, said second input lead of each of said logic gates being connected to a corresponding one of said signal output leads of said second converter, said output lead of each of said logic gates being connected to said central processor; and a gating means having first and second input leads and an output lead, said first input lead of said gating means being connected to said illegal-input code flag lead of said first converter, said second input lead of said gating means being connected to said illegal-input code flag lead of said second converter, said output lead of said gating means being connected to said processor.

4. Multiple code conversion apparatus as defined in claim 3 including:

a parity generator having a plurality of input leads and an output lead, each of said input lead of said generator being coupled to a corresponding one of said signal output leads of each of said logic gates, said output lead of said generator being connected to said processor.

5. Multiple code conversion apparatus for use with a storage medium and a central processor, said apparatus comprising:

first and second ROM code converters each having a plurality of signal input leads, a control lead, a parity output lead and a plurality of signal output leads, each of said input leads of said converters being connected to said storage medium;

a source of control signals, said source being connected to said control lead of each of said converters;

a plurality of logic gates each having first and second input leads and an output lead, said first input lead of each of said logic gates being connected to a corresponding one of said signal output leads of said first converter, said second input lead of each of said logic gates being connected to a corresponding one of said signal output leads of said second converter, said output lead of each of said logic gates being connected to said central processor;

a gating means having first and second input leads and an output lead, said first input lead of said gating means being connected to said parity output lead of said first converter, said second input lead of said gating means being connected to said parity output lead of said second converter;

a parity checker having a plurality of signal input leads, a parity lead and an output lead, said input leads of said checker each being connected to a corresponding one of said output lead of said logic gates, said output lead of said gating means being connected to said parity lead of said checker, said output lead of said checker being connected to said processor.

6. Multiple code conversion apparatus for use with a storage medium and a central processor, said apparatus comprising:

first and second ROM code converters each having a plurality of signal input leads, a control lead, an illegal-input code flag lead, a parity output lead and a plurality of signal output leads, each of said input leads of said converters being connected to said storage medium;

a source of control signals, said source being connected to said control lead of each of said converters;

a plurality of logic gates each having first and second input leads and an output lead, said first input lead of each of said logic gates being connected to a corresponding one of said signal output leads of said first converter, said second input lead of each of said logic gates being connected to a corresponding one of said signal output leads of said second converter, said output lead of each of said logic gates being connected to said central processor;

first and second gating means each having first and second input leads and an output lead, said first input lead of said first gating means being connected to said illegal-input code flag lead of said first converter, said second input lead of said first gating means being connected to said illegal-input code flag lead of said second converter, said output lead of said first gating means being connected to said processor, said first input lead of said second gating means being connected to said parity output lead of said first converter, said second input lead of said second gating means being connected to said parity output lead of said second converter; and a parity checker having a plurality of signal input leads, a parity lead and an output lead, said input leads of said checker each being connected to a corresponding one of said output leads of said logic gates, said output lead of said second gating means being connected to said parity lead of said checker, said output lead of said checker being connected to said processor.

* * * * *